Jan. 5, 1937.   S. GOLDSCHMIDT ET AL   2,066,726
METHOD OF PRODUCING SHEETS FROM UREA FORMALDEHYDE RESINS
Filed May 5, 1933
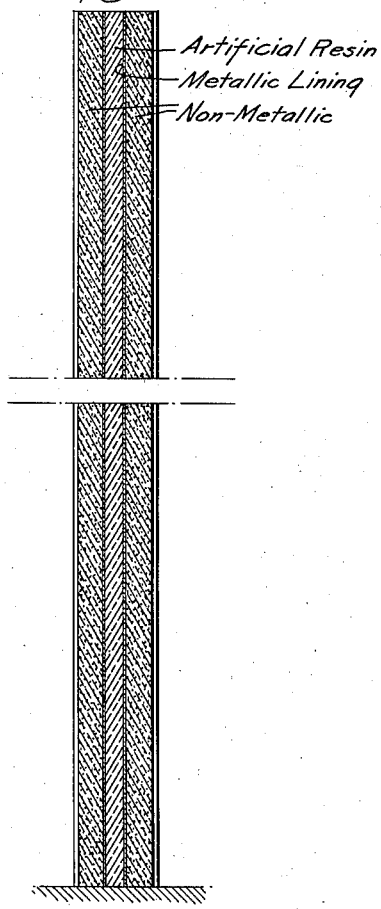
Inventors:
Stefan Goldschmidt
Emil Gerisch
Wilhelm Beuschel
Arthur Müller
By Byrnes, Townsend & Potter
Attorneys.

Patented Jan. 5, 1937

2,066,726

UNITED STATES PATENT OFFICE 2,066,726

METHOD OF PRODUCING SHEETS FROM UREA FORMALDEHYDE RESINS

Stefan Goldschmidt, Emil Gerisch, Wilhelm Beuschel, Karlsruhe, and Arthur Müller, Berlin-Charlottenburg, Germany, assignors, by mesne assignments, to Thekla Müller, Berlin-Charlottenburg, Germany Application May 5, 1933, Serial No. 669,564
In Germany October 31, 1927

9 Claims. (Cl. 18—47.5)

This invention relates to sheets or the like composed of artificial masses containing urea and formaldehyde condensation products, and to a method of and apparatus for producing the same, and has for its object to provide sheets or the like of this nature as a substitute for sheets of glass, more particularly in those cases in which the property of glass resulting in sharp fragments constitutes an undesirable factor.

Sheets or the like of this nature as heretofore known possess the disadvantage that the same acquire a condition of instability when in use or stored for an appreciable length of time. It has already been suggested that this instability may be wholly overcome by variation in the chemical composition and by the nature of the condensation process. As a result, however, of numerous tests conducted with sheets of large dimensions it has been found that the proposals hitherto made are not sufficient alone.

It has been found that sheets or the like possessing absolute stability as regards their mechanical, physical and chemical properties may be obtained only by the combination of certain conditions, as will be shown later.

An additional object of the invention relates to a simplified form of production, particularly when manufacturing on a large scale.

A still further object of the invention is the provision of absolutely transparent and plano-parallel sheets which when demolished will not result in numerous sharp fragments, as in the case of ordinary silicate glass.

The invention is not limited to purely formaldehyde substances, but also covers all equivalents, such as thiourea, polymers of formaldehyde and also condensation products, into which, in addition to those referred to, there are also worked other products of condensation, such as those composed of polyvalent alcohols and polybasic carboxylic acids. If desired, there may also be added to these condensation products softeners, such as ethyl acetanilide, triacetine, benzyl acetate, etc. The invention is illustrated by the accompanying drawing in which Figure 1 is an illustration of a method of molding embodying the principles of the invention, Figure 2 is an illustration of a sheet produced in accordance with the invention and Figure 3 is an illustration of a modified form of sheet produced in accordance with the invention.

The invention is based on the recognition that in order to attain the stated objects attention requires to be paid, in addition to variations in the chemical composition and in the nature of the condensation, above all to the plano-parallel nature of the product or casting, and the nature and duration of the drying process. According to the invention, the liquid condensation mass, for the purpose of obtaining a plano-parallel nature of the castings, is poured into closed molds consisting of a non-metallic material, more particularly acid stone, glasses, plywood and the like. Further, the solidified castings are allowed to dry in a moist agent until the specific weight no longer increases in use, whereby if desired the castings may be pressed prior to completion of the drying process. The use of closed molds ensures that the castings, after removal from the mold, will completely coincide in their nature on all sides. Selection of the stated materials for the molds ensures the desired plano-parallelism of the castings, as the use thereof in place of the metals otherwise usual avoids the disadvantage associated with the latter, viz., the tendency towards appreciable distortion when heated.

In connection with metallic molds this disadvantage may be avoided only by producing the molds with a thickness of material such as to render the same uneconomical and, from a technical aspect, incapable of use. Since the non-metallic materials above referred to withstand only in part the attack of the liquid condensation mass, the surfaces of the molds which enter into contact with the mass may, if desired, pursuant to the invention, be furnished with a thin coating of a metal which is not readily attacked by the condensation mass as shown in Figure 1. For example, molds composed of limestone may be protected by a coating of aluminium, which is renewed after the mold has been employed several times.

According to the invention, the solidified castings are dried in a moist agent, whereby the moisture content of the agent is gradually diminished as the drying proceeds. For example, drying is commenced in an agent containing a dispersive solvent content situated approximately 10% below the saturation limit, and completed with a saturation content of approximately 50%.

An essential feature associated with the drying process must be considered to reside in an even drying on all sides as the operation proceeds. This steady drying on all sides is accomplished, according to the invention, by subjecting the solidified castings to the action of the continuously moved drying agent, and repeatedly turning the same about as drying takes place. This may be performed preferably by means of an automatic turning device, with the assistance of which the castings are turned about at given intervals without prejudicial effect on their form.

The even drying of the plates or sheets on all sides may additionally be assisted by covering the edges (i. e., the bounding surfaces vertical to the plane of the sheet), for example with a rapidly drying lacquer or varnish or with readily fusing substances. Dependent on the nature and the thickness of the coating employed, the latter may also extend beyond the edges in order to ensure the desired even drying of the marginal and middle portions. The covering of the edges may naturally also be performed by placing about the same a permanently located, previously formed body, such as a rubber band, resiliently mounted wooden strips or the like.

The use of humid air for drying purposes has the object of reducing as far as possible the difference between the vapor pressure of the dispersing solvent in the casting and the partial pressure of the same in the drying agent. The same result, however, may also be obtained by enclosing the casting within a porous covering, for example a covering composed of porous clay, microporous rubber, felt or the like. The effect of these porous materials is based on the fact that, proceeding through the porous covering, the tension of the dispersing agent gradually decreases from the tension in the casting to be dried to the tension in the drying agent. This decrease may be controlled to a considerable degree by the thickness of and the size of the pores of the porous material. An additional advantage of this method of drying resides in the possibility of also employing a drying atmosphere of that nature in which the tension of the dispersion agent is merely very low. It is also possible when drying on the latter lines to dispense entirely with the turning about of the articles. The two processes may also be combined with each other at different stages of the drying.

For certain purposes of use, for example as a substitute for mirror glass in vehicles, a particular nature of the surface of the sheets may be desired. This, in accordance with the invention, may be accomplished in extremely simple fashion, not only by grinding and polishing, but also by pressing the castings before the same have completely dried. In this connection the procedure may be such that castings of the composition set forth in Example 1 are dried down to a specific weight, which preferably is situated between 1.46 and 1.47, thereupon pressed in the hot state, and then finally dried as described above. In certain instances greater advantage may be obtained in conducting the drying process almost up to completion, and subjecting the castings, prior to the pressing operation, to the action of water, preferably by immersing them for a brief space of time in water at a temperature between 50° and 80° C., or by treating with moisture-laden air. The latter form of treatment will lead to the desired result particularly in those cases in which extensively dried castings, when subjected to direct pressing, reveal a cloudy condition without the treatment in question. This cloudy nature may then be avoided. The effect of the second measure referred to resides possibly in the fact that a homogenization of the castings takes place as regards the degree of drying, certainly without this being apparent from any appreciable variation in weight.

For obtaining a perfectly smooth surface of the castings pressing takes place in accordance with the invention between two sheets of plate glass, which are hardened in the manner known per se.

Certainly, it would also be possible to employ absolutely flat-ground metallic plates for pressing purposes, but only very few metals are able to resist permanently the chemical action of the castings at the high temperatures concerned, and may be produced, if at all, only at very considerable expense with a surface of such absolute smoothness as is peculiar to plate glass, so that plate glass offers greater advantage also from an economical aspect. If the entirely smooth surface is required on both sides of the sheet, there will naturally be employed on either side pressing members composed of hardened plate glass.

As regards the nature of the pressing operation, it is characteristic that the same is not performed until the drying process has reached a stage at which the pressing methods hitherto proposed are no longer capable of being employed. According to the invention, the pressing of the castings which have reached this stage of the drying process is effected, after heating to a temperature not appreciably exceeding the condensation temperature, and amounting to approximately 115–130°, in such a manner that the increase in pressure is performed over long periods of time, and if necessary the pressure maintained for lengthy periods.

As stated above, the properties of the finished sheets are also determined in part by the nature and the chemical composition of the condensation process. Thus, for example, masses are obtained which are readily capable of being cast if, in accordance with the invention, condensation is performed at increased temperature in preferably non-acid solution until gelatinous masses are formed when standing or cooling, and immediately before casting acid is added in such amount that the pH of the solution amounts to less than 7.

This process is based on the novel recognition that the condensation may be performed to the end in a non-acid, for example alkaline medium, and acid added to the final products merely for the purpose of more rapid gelatine formation and for controlling the colloidal chemical properties.

The stability of the final products may be acted upon in a favorable sense more particularly when conjoint use is made of condensation products consisting of polyvalent alcohols and polybasic carboxylic acids or their derivatives. When using the condensation products of polybasic carboxylic acids and polyvalent alcohols or their derivatives it is apparently not a matter of solid solution of these products in the final products, but a condensation with the still free amino groups emanating from the urea employed for condensation purposes.

Conjoint use of the stated condensation products of polybasic acids and polyvalent alcohols offers the additional advantage that the production of the masses for casting may also be conducted on other lines. The procedure may be such that at first condensation is performed in a watery agent, and the condensation product, by drying as desired, then freed practically entirely of water, and the dry mass converted into a liquid by heating with solvents of low boiling point, if necessary under pressure. For more rapid drying and also conversion into a liquid it is desirable to disintegrate to a wide extent the primary products of condensation. By means of the process as last described it is possible to subject the resulting solutions to the gelatinizing and subsequent hardening process in direct fashion, or to make part use of these solutions upon the condensation in watery solution.

In this manner it is accomplished that also waste products, which result in the course of or after completion of the manufacture or in use, may again be introduced into the production.

Experience shows that condensation products of urea and formaldehyde, the pH of which is less than 7, assume a gelatinous condition relatively quickly both in a hot as well as a cold condition. This may result in certain difficulties when performing the casting operation. According to the invention, these difficulties may be avoided by making the casting process a continuous one by performing the condensation in a non-acid agent in large vessels and adding the acids as required merely to small portions of the condensation solution. In an intermittent operation the same result may also be obtained when utilizing the novel recognition that the time of gelatinizing of the acid condensation solutions may be determined beforehand without removal of the water by the addition of low alcohols in corresponding amount. Naturally, both measures may also be employed in combination.

For certain purposes of use of the sheets or the like it may be desirable to coat the sheet at certain points on the one side with a thin foil of glass in order to obtain a large surface hardness as shown in Figure 3.

The sheets, etc., produced according to the invention are characterized by the fact that the same are completely stable. Thus, for example, they have been found as a result of experiments conducted over a lengthy period of time to be stable to water and atmospheric effects, such as light, sun, variation in temperature, or rain. They also do not show any variation in heated rooms, where they are subjected on the one side to the warm air of the room, and on the other side to the cold winter air.

These sheets also fail to reveal cracks proceeding from the edges when stored for a long time, as in the case of the sheets hitherto known.

In accordance with comparative demolition tests made, the sheets according to the invention disclose advantages over silicate glass and so-called safety glass. As compared with silicate glass they do not result in sharp fragments, and in comparison with the so-called safety glasses they may be demolished rapidly and without danger even by parts of the body, in consequence of which serious injuries are avoided upon the occurrence of accidents.

The invention will now be described more fully with reference to the following examples:

*Example 1.*—80 kilogrammes of para-formaldehyde, 50 kilogrammes of water and 63 kilogrammes of urea, after the addition of 4 litres of 2-n soda solution, are heated under agitation until everything has passed into solution, whereupon boiling is performed for 1 hour on a return cooler. There are then added 10 kilogrammes of a viscous condensation product, which has been prepared from 330 parts by weight of glycerine and 67 parts by weight of adipinic acid by heating for several hours, with distillation of the liberated water. Finally, boiling is again performed for 30 minutes in the reflux cooler. There are then added 6 kilogrammes of 2-n sulphuric acid, in which have been dissolved 2 kilogrammes urea. Boiling is performed on the reflux cooler until the whole has become clear, which requires a few minutes. The substance is then poured into the prepared molds.

These molds consist of vertically disposed, ground and polished plates of fine grain Swedish Schweinfurt-green diabase, which are spaced apart by iron frames in accordance with the desired thickness of the castings. If molds are employed, the dimensions of which amount to 125×80 cm., the stated material, with a thickness of the castings amounting to 6 mm., permits of the production of approximately 10 sheets. Cooling is allowed to take place in the mold, which is opened after 6–8 hours. The casting may then be detached from the mold without trouble.

The castings removed from the mold, which are homogeneous on all sides and completely plano-parallel, are then dried. This is performed by conducting over the castings air of gradually increasing temperature and gradually decreasing humidity, whereby the moisture content at the commencement of the drying process is situated approximately 90% and towards the end of the drying process approximately 40% below the saturation pressure of the steam or vapor at the particular drying temperature concerned. It must be ensured by a suitable device that during the course of the drying process the sheets, resting on flat bases, are continuously turned about so long as they are soft and offer little resistance to variation in form, so that during the drying operation they are washed by the drying air in even fashion. When the sheets are sufficiently resistant to a variation in form, additional drying may also be performed in suitable fashion with the sheets suspended. In this case, however, care also requires to be taken that the drying air is always able to wash the sheets evenly on all sides.

By a suitable rate of flow of the drying air in conjunction with the correct percentage of moisture it may be accomplished that the sheets do not warp during the drying operation. It has been found convenient not to renew continuously the complete air employed for drying purposes, but again to introduce into the drying process a part of the air laden with formaldehyde.

*Example 2.*—The mass is condensed and poured as described in conjunction with the first example, and the still plastic moldings are encased on all sides with wool felt of approximately 1 cm. in thickness. In the tests made the felt was reinforced by placing the same on thin honeycomb frames. The encased casting is suspended in a drying chamber, the temperature of which may be adjusted in desired fashion. Through this drying chamber there is sucked ordinary indoor air of gradually increasing temperature at such a speed that the air in the drying apparatus is renewed approximately every 5 minutes.

*Example 3.*—Condensing, casting and drying is performed as in the case of Example 1 or 2, but 2 or 3 days after commencement of the drying operation, which continues for a period of several weeks altogether, the castings are furnished on the edge surfaces with a coating of acetyl-cellulose varnish, which if necessary may be renewed during the course of the further drying process.

*Example 4.*—16 kilogrammes para-formaldehyde, 13 kilogrammes urea, 9 kilogrammes of water and 800 ccm. of 2n-soda solution are boiled in a reflux cooler for several hours. The heating is then interrupted, and 1200 ccm. of 2-n sulphuric acid are added slowly to the still hot solution.

The hot liquid condensation mass is then immediately poured into molds, in which the same solidifies after a short time.

In place of 1200 ccm. 2-n sulphuric acid, it is also possible to employ 1100 ccm. of 2-n hydrochloric acid or 2400 ccm. of a 2-n tartaric acid.

*Example 5.*—Castings which are produced in accordance with Example 1 are dried for such length of time until the specific weight is between approximately 1.46 and 1.47. The castings are now placed in a hydraulic press, which is capable of being heated, between polished nickel-chromium steel plates or highly polished chromium-plated brass plates of approximately 5 mm. thickness. The temperature of the press is set at 120° C., and the material is subjected gradually over a period of, say, 30–50 minutes to pressures increasing up to 250–300 atmospheres. The maximum pressure is maintained for a certain space of time (approximately 15–30 minutes), whereupon the heating is cut off and cooling allowed to take place, without varying the pressure, for such length of time until the temperature has dropped to 40–50° C. The detached castings are placed between flat guard plates until they have completely cooled.

*Example 6.*—Castings which were produced in accordance with Example 1, but were almost completely dried, were placed in water of approximately 80° C. for approximately 10 minutes, dried on the surface after removal, and then pressed in the manner described in Example 5. In place of the metallic plates there was employed sheet glass of approximately 5 mm. thickness, hardened in the manner known per se. The pressure employed for pressing purposes was between 100 and 150 atmospheres; the temperature amounted to roughly 110° C.

*Example 7.*—Condensation is performed in accordance with Example 1, and the mass poured on to a base. After solidifying the cake is disintegrated so as to form pieces roughly the size of peas, and drying performed for several days at a temperature of approximately 80° C. The material is now of such a nature that the same may be ground to a very fine degree. The pulverulent product is then dried practically up to completion, for which purpose 2–3 days are necessary at the temperature stated. The completion of the drying process, which may also be conducted in vacuum, may be controlled by water determination in the dry material.

300 grammes of the dry condensation product are now dissolved in the same amount by weight of methyl alcohol at approximately 120° C. in an autoclave under agitation. The completely clear solution is then freed by distillation from the greater part of the solvent, and cast in a hot condition after the addition of approximately 3 grammes formic acid.

The masses obtained by dissolution are preferably poured in molds which are lined with paper, and preferably ungummed paper. It is thus accomplished that the casting together with its paper base may readily be removed from the mold. During or after completion of the drying process the paper may be removed, for example by grinding. Naturally, the paper may also be replaced by a textile material. The mold may also be lined with a foil of such material that during or after completion of the drying operation the same may be removed by means of a suitable solvent.

*Example 8.*—8 kilogrammes para-formaldehyde, 6.3 kilogrammes urea and 7 kilogrammes of water together with 400 ccm. 2-n soda solution are boiled for a certain time in a reflux cooler.

There are thereupon added 500 ccm. 2-n sulphuric acid, and boiling is then performed for such length of time until the mass commences to become viscous and one drop removed from the same rapidly solidifies. To the still hot mass there are then added 6000 ccm. alcohol (96%), and the mass allowed to cool. The cold solution retains its liquid condition several days before it is converted into gelatine. By a correspondingly slight addition of alcohol, which requires to be determined in each single case, the duration of this conversion may be adjusted as desired. If in producing the condensation product the methods are adopted according to Example 1 or 2, the time of the conversion into gelatine also in this case may be controlled in corresponding fashion by the addition of ethyl alcohol or methyl alcohol.

What we claim as new and desire to secure by Letters Patent is:

1. In the production of transparent, substantially plano-parallel sheets from compositions containing condensation products of formaldehyde and its polymers with ureas, thioureas and mixtures thereof together with solvents therefor by pouring the composition into molds, solidifying the castings, and thereafter removing the castings from the molds and drying the castings, the improvement which comprises casting the compositions in closed molds composed of non-metallic material and drying the solidified castings after removal from the molds in a medium containing a controlled amount of the same solvent which is to be removed from the casings during the drying operation.

2. A process as defined in claim 1 in which the castings are pressed between polished sheets of surface-hardened glass when the drying operation is only partially completed.

3. A process as defined in claim 1 in which the castings are pressed at a temperature of about 115–130° C. under gradually increasing pressure over a relatively long period of time when the drying operation is only partially completed.

4. In the production of transparent, substantially plano-parallel sheets from compositions containing condensation products of formaldehyde and its polymers with ureas, thioureas and mixtures thereof together with solvents therefor by pouring the compositions into molds, solidifying the castings, and thereafter removing the castings from the molds and drying the castings, the improvement which comprises casting the compositions in closed molds composed of non-metallic material lined with a corrosion-resistant metal foil and drying the solidified castings after removal from the molds in a medium containing a controlled amount of the same solvent which is to be removed from the casting during the drying operation.

5. A method as defined in claim 1 in which the castings are coated with a porous evaporation-retarding material during at least a portion of the drying operation.

6. In the production of transparent, substantially plano-parallel sheets from compositions containing condensation products of formaldehyde and its polymers with ureas, thioureas and mixtures thereof together with solvents therefor by pouring the compositions into molds, solidifying the castings, and thereafter removing the castings from the molds and drying the castings, the improvement which comprises carrying out the condensation under non-acid conditions until the product gelatinizes on standing, adding an acid in such an amount that the pH of the product is less than 7, casting the compositions in closed molds composed of non-metallic material, and drying the solidified castings after removal from the molds in a medium containing a controlled amount of the same solvent which is to be removed from the casting during the drying operation.

7. In the production of transparent, substantially plano-parallel sheets from compositions containing condensation products of formaldehyde and its polymers with ureas, thioureas and mixtures thereof together with solvents therefor by pouring the compositions into molds, solidifying the castings, and thereafter removing the castings from the molds and drying the castings, the improvement which comprises carrying out the condensation under non-acid conditions until the product gelatinizes on standing, adding an acid in such an amount that the pH of the product is less than 7, adding a lower alcohol in predetermined amount to regulate the gelatinizing period, casting the composition in closed molds composed of non-metallic material and drying the solidified castings after removal from the molds in a medium containing a controlled amount of the same solvent which is to be removed from the casting during the drying operation.

8. In the production of transparent, substantially plano-parallel sheets from compositions containing condensation products of formaldehyde and its polymers with ureas, thioureas and mixtures thereof together with solvents therefor by pouring the compositions into molds, solidifying the castings, and thereafter removing the castings from the mold and drying the castings, the improvement which comprises admixing with said condensation products condensation products of polyhydric alcohols and aliphatic polybasic carboxylic acids, casting the compositions in closed molds composed of non-metallic material and drying the solidified castings after removal from the mold in a medium containing a controlled amount of the same solvent which is to be removed from the castings during the drying operation.

9. In the production of transparent, substantially plano-parallel sheets from compositions containing condensation products of formaldehyde and its polymers with ureas, thioureas and mixtures thereof together with solvents therefor by pouring the compositions into molds, solidifying the castings, and thereafter removing the castings from the mold and drying the castings, the improvement which comprises admixing with said condensation products condensation products of polyhydric alcohols and polybasic acids, dehydrating the mixture, liquefying the mixture with low-boiling solvents, casting the compositions in closed molds composed of non-metallic material and drying the solidified castings after removal from the mold in a medium containing a controlled amount of the same solvent which is to be removed from the castings during the drying operation.

STEFAN GOLDSCHMIDT.
EMIL GERISCH.
WILHELM BEUSCHEL.
ARTHUR MÜLLER.